United States Patent [19]

Petrovic

[11] Patent Number: 4,523,906

[45] Date of Patent: Jun. 18, 1985

[54] DEVICE FOR DRYING GYPSUM

[75] Inventor: Vladan Petrovic, Essen, Fed. Rep. of Germany

[73] Assignee: Krupp-Koppers GmbH, Essen, Fed. Rep. of Germany

[21] Appl. No.: 447,628

[22] Filed: Dec. 6, 1982

[30] Foreign Application Priority Data

Dec. 23, 1981 [DE] Fed. Rep. of Germany ....... 3151045

[51] Int. Cl.³ .................. F27B 15/00; C04B 11/02
[52] U.S. Cl. .................................. 432/197; 423/171; 432/27; 432/215
[58] Field of Search .................. 432/27, 197, 215; 423/171, 172

[56] References Cited

U.S. PATENT DOCUMENTS

| 2,994,523 | 8/1961 | Mitchell | 423/172 |
| 3,158,441 | 11/1964 | Stevens | 432/197 |
| 3,437,330 | 4/1969 | Worner | 423/172 |
| 4,101,630 | 7/1978 | Stiling | 432/171 |
| 4,193,758 | 3/1980 | Peterson et al. | 432/27 |

Primary Examiner—John J. Camby
Attorney, Agent, or Firm—Michael J. Striker

[57] ABSTRACT

Cold, wet gypsum is admixed to a moving bed of hot solid particles of a heat-retaining material. The mixture is fed to a moving bed type drier where it is agitated while the released vapors are withdrawn. After discharge from the drier, dry gypsum is separated from the heating particles and the latter are recirculated into a heater. Preferably, flue gases from a combustion chamber are employed for heating the particles, which are preferably in the form of steel balls.

6 Claims, 8 Drawing Figures

DEVICE FOR DRYING GYPSUM

BACKGROUND OF THE INVENTION

The present invention relates in general to processing of gypsum, and in particular to a method and a device for drying cold, moist gypsum.

Gypsum to be dried has at an ambient temperature between 0° and 20° C., a water content up to 50% and a grain size classification up to 100 microns or more.

For drying gypsum of this kind, numerous methods have already been devised, suitable for large-scale operation, such as for example drying a flying stream of gypsum in hot gases or by means of indirect heating via heat exchanging surfaces in driers such as rotary drum driers.

All such prior-art methods, however, require high investment costs for the requisite machinery and the energy consumption during operation is also large.

SUMMARY OF THE INVENTION

It is therefore a general object of the present invention to overcome the aforementioned disadvantages.

More particularly, it is an object of the invention to provide an improved drying method which permits lower investment expenditures and can be performed at lower energy consumption rates.

In keeping with these objects and others which will become apparent hereafter, one feature of the invention resides in a method in which hot solid particles preheated to a temperature which is higher than the desired final temperature of the gypsum, is admixed to a stream of the cold, moist gypsum.

According to another feature of this invention, the solid particles have substantially uniform surface without edges, sharp corners, projections or indentations. Particularly suitable are solid particles of spherical configuration. It is also advantageous for effective intermixture of gypsum with the heat-carrying particles to employ particles classified in a narrow size range, for example both of uniform size, preferably of a diameter which is smaller than 40 mm.

The solid particles can be made of any suitable abrasion-resistant, heat-retaining material. This material can be either a metal such a steel or cast iron or a non-metallic material such as ceramic or porcelain. Even such bodies of mechanically and heat-resistant synthetic materials can be employed. Useful also are materials of natural origin such as pebbles sorted according to their form and size. Essential in selection of materials for the drying solid particles is their high abrasion-resistance. In the case of non-metallic materials, the mechanical wear-resistance according to DIN 52108 is to be smaller than 0.45 cubic centimeters per square centimeter. Of particular importance is also the heating quality of the solid bodies. It is to be recommended to use solid bodies of a heat-absorption coefficient which is smaller than 16,000 $J/m^2K\ S^{0.5}$, preferably smaller than 5000 $J/m^2K\ S^{0.5}$. The temperature conductivity coefficient should be smaller than $700 \times 10^{-4}\ m^2/h$, preferably smaller than $150 \times 10^{-4}\ m^2/h$, and the specific heat of the solid body should be larger than 400 J/kgK, preferably larger than 800 J/kgK. In this connection, it should be mentioned that it is desirable to keep the ratio between the amount of heat-transferring solid particles and the amount of gypsum as low as possible. Therefore, it is of advantage to select solid bodies which have a high heat-retaining quality.

Furthermore, according to the invention, the solid particles are preheated to a temperature of about 300° C. The preheating can be performed by means of gases from an arbitrary heat source. Preferably, flue gases from a combustion chamber are employed.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
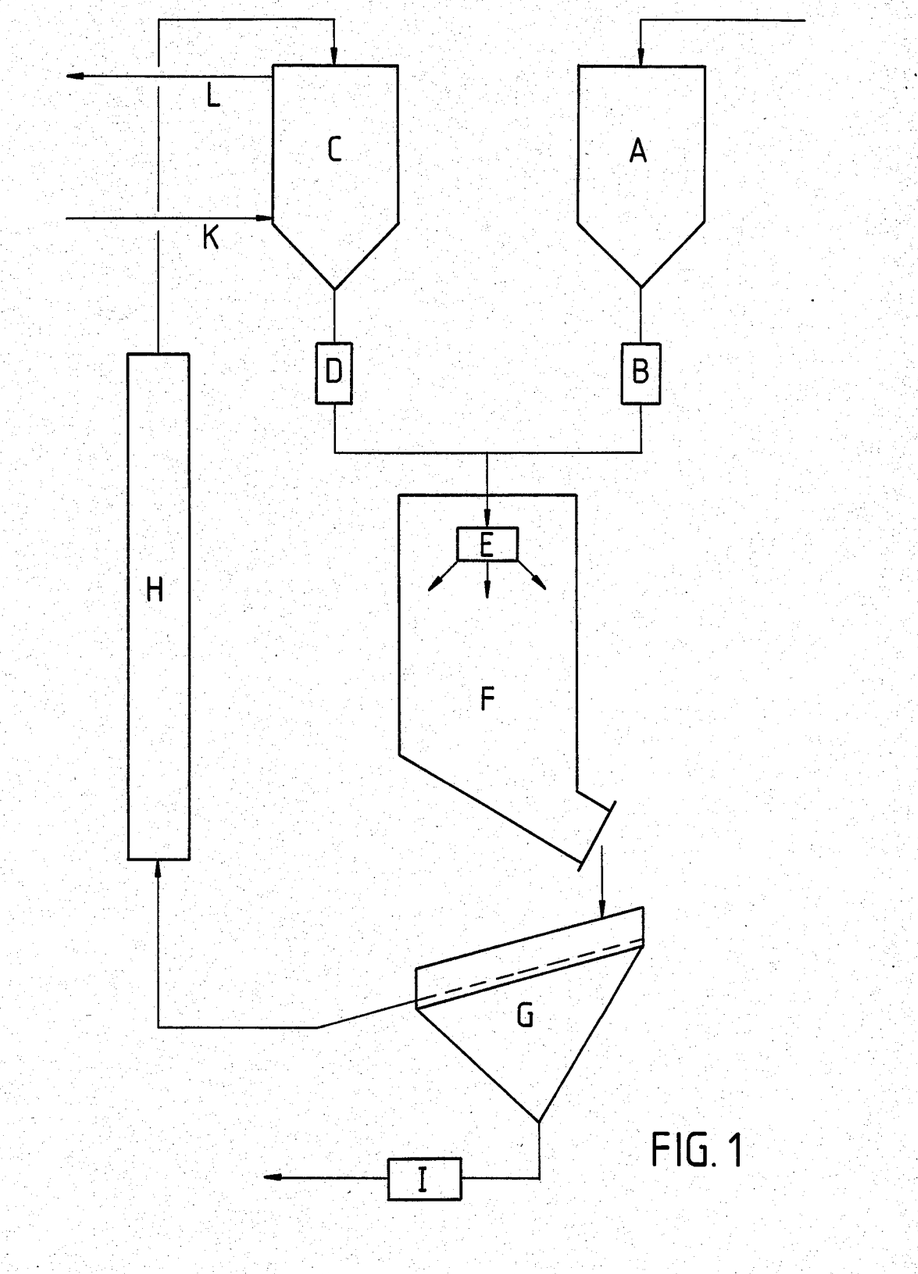
FIG. 1 is a schematic diagram of a device for performing the method of this invention.

Referring firstly to FIG. 1, wet gypsum is fed through a supply bin A via a dosing device B and hot solid particles are fed from a heater C through a dosing device D, to a common distributing device E and the mixture is discharged into a gypsum drier F. The intermixed and hot solid particles pass in a unidirectional current through the drier F and in the pregress the solid particles transfer part of their retained heat energy to the gypsum particles. Vapors expelled from the gypsum are withdrawn through suitable exit spaces.

At the outlet of drier F, dried gypsum is separated by conventional separating means such as vibrating screens, for example, from the solid particles and is fed to a whirling bed I. The discharged solid particles are recirculated by a bucket conveyor H for example into the heater C.

In the heater C, the particles are exposed to flue gases from a furnace or to hot gases from another heat source. In FIG. 1, the supply duct for hot gas is indicated by K and the exhaust duct by L. In the subsequent illustrations of modifications of this arrangement, the heating gas is flue gas from a combustion chamber.

Figure 2:
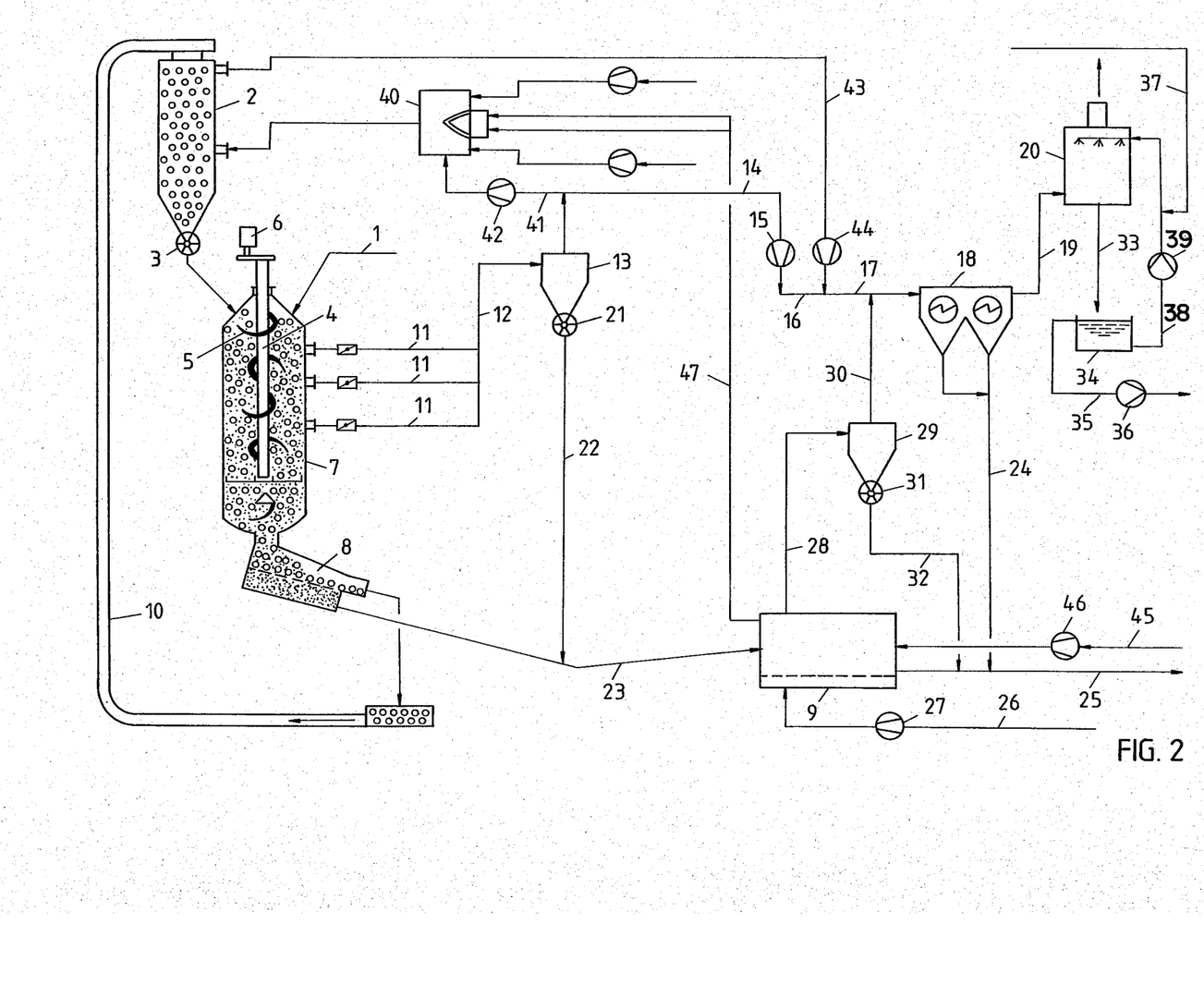
FIG. 2 shows schematically an embodiment of the device of this invention using an upright moving bed drier.

In FIG. 2, wet gypsum is continuously fed through supply conduit 1 into a moving bed drier 7 which in this example has the form of an upright cylindrical vessel. At the same time, a continuous stream of hot solid particles is discharged from heater 2 via air lock valve 3 into the drier 7. The solid particles in this example are in the form of steel balls.

The hot steel balls and the wet gypsum are charged at the upper part of the drier 7, and during their continuous downward flow the mixture is agitated by stirring arms 5 of an agitator 4. Reference numeral 6 indicates a drive for the agitator. The continuous intermixing movement due to the action of the agitator ensures that the hot balls are always brought into contact with new feed of gypsum, so that the latter is subjected to a substantially uniform heat treatment. Resistances encountered during the descent of gypsum in the drier are overcome by the inherent weight of the gypsum and by the weight of the steel balls, whereby the time of dwell of the mixture in the drier is determined by the rate of discharge of the gypsum and of the balls at the lower region of the drier.

In the embodiment according to FIG. 2, there is employed a separating-discharging device 8, including a vibrating screen or a pneumatic separator. In this device, gypsum heated to a temperature of about 120°–130° C. and dried to a moisture content of about 6% is sifted from the steel balls and conveyed via conduit 23 to a whirling bed chute 9. The separated steel balls are conveyed by a conveyor 10, which can be for example a chain conveyor, a bucket conveyor, or the like, back into the heater 2. Vapors expelled from the treated gypsum in the drier 7 are exhausted through branch conduits 11 located at different levels of the drier 7 and via a collecting conduit 12 into a cyclone 13. A suction blower 15 withdraws via conduit 14 the vapors from the cyclone 13 and supplies them via conduits 16 and 17 to an electrostatic precipitator 18 from which the filtered vapors are applied via conduit 19 into a recirculating washer 20 in which condensation and removal of pollutants takes place.

Gypsum grains separated in cyclone 13 reach, via air lock 21 and conduits 22 and 23, the whirling bed chute 9. The gypsum thus separated in the electrostatic filter 18 is fed through conduit 24 into the discharge conduit 25 from the whirling bed chamber 9. The bulk of the treated gypsum, which has been cooled off in the whirling bed chamber 9 to a temperature of about 15° C., is also discharged through conduit 25 and conveyed for further uses. The whirling bed in chamber 9 is maintained by a stream of cool air delivered through conduit 26 and blower 27. Exhaust air stream laden with gypsum dust is discharged from the whirling bed chamber 9 through conduits 28 into a cyclone 29, where a major part of the gypsum dust is separated, and the air from the cyclone flows through conduits 30 and 17 into the electric filter 18 and therefrom via conduit 19 into the washer 20. Gypsum separated in cyclone 29 passes through air lock 31 and conduit 32 in the discharge conduit 25. Used liquid from the circulating washer 20 is fed through conduits 33 into condensate tank 34 and sludge deposited in the container 34 is withdrawn by means of a pump 36 through the conduit 35. Washing water supplied from conduit 37 is admixed as a partial stream to the recirculating water delivered by another pump 39 from the tank 34 and thus adjusts the water supply to the washer 20 to a desired temperature.

The recirculating solid particles, as mentioned before, are preheated in heater 2 by means of flue gases resulting from firing gaseous, liquid or solid fuels in a combustion chamber 40. Since the flue gases generated during the combustion have a temperature of about 1500° C., which is excessively high for heating the solid bodies used in the heat treatment of the gypsum, a partial stream of vapors exiting from the cyclone 13 is blown by means of a blower 42 and a conduit 41 into the heating stream of flue gas. The resulting mixture is thus reduced in temperature to about 800° C., and at this temperature the heating gas stream is supplied into the heater 2 and, upon preheating of the present drying particles, is discharged at a temperature of about 100° C. and via conduit 43 and blower 44 is connected to conduit 17 wherefrom it passes through electric filter 18 and conduit 19 into the recirculating washer 20. The steam content of the vapors condenses during the washing operation, and the residual flue gases are then released into the outer atmosphere.

The cooling of the gypsum in the whirling bed chamber is performed indirectly by means of cool air supplied through conduit 45 by means of blower 46 into heat exchanging pipes in the chamber 9, whereupon the heated up air is discharged through conduit 47 into the burner of the combustion chamber 40.

Figure 3:
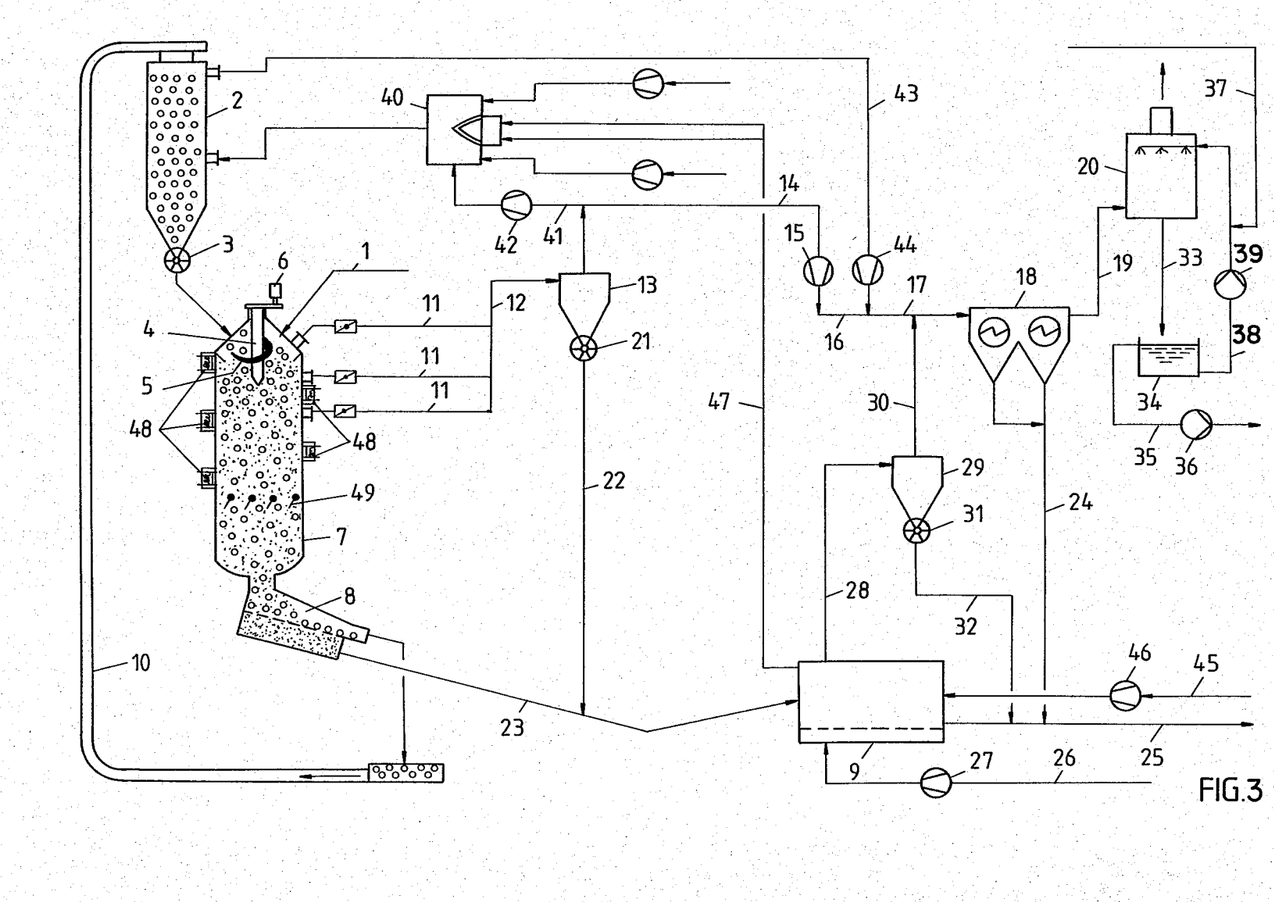
FIG. 3 shows a moving bed drier in the form of an upright container provided on its outer surface with control solenoids.

A modification of the upright moving bed drier 7 is illustrated in FIG. 3. In this example, the agitator 4 with stirring arms 5 is arranged only in the intake region of the wet gypsum and of the hot steel balls in the upper part of the drier 7, whereas in the rest of the drier the mixture of balls and gypsum travels downwardly through the drier as a fixed, nonagitated bed. In order to loosen up the gypsum material and to prevent formation of nests of the heating balls in the central region of the drier 7, there are provided on the outer surface of the drier 7 solenoids 48 distributed in a staggered pattern. The solenoids are periodically activated and by magnetic induction keep the steel drying balls separated from each other.

The retention or dwell time of the gypsum in the moving bed drier is controlled in this embodiment again by the separating and discharging member 9 similarly as in the preceding example, and in addition by adjusting the position of the throttling flaps 49 in the interior of the drier.

Figure 4:
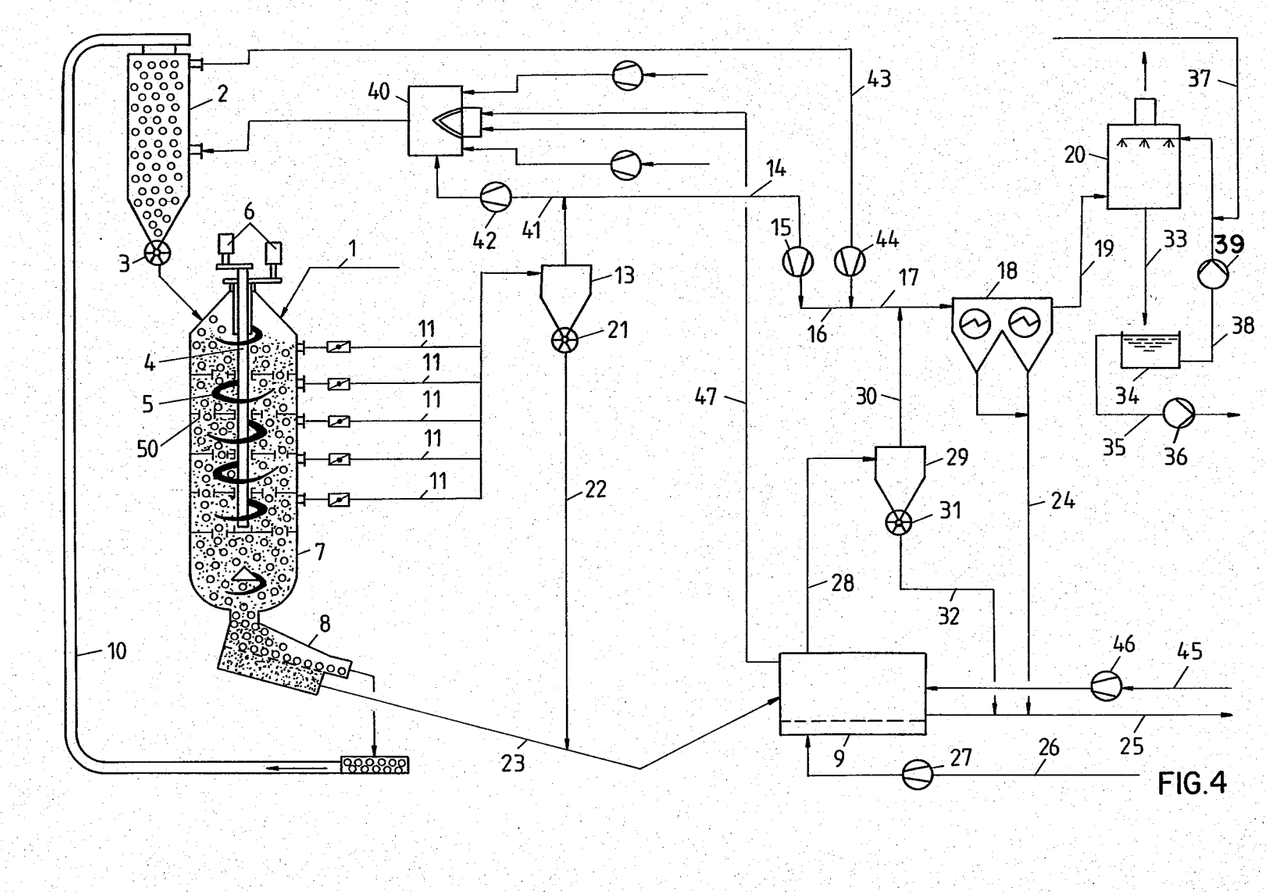
FIG. 4 shows an embodiment of this invention using a multiple-stage upright drier.

In the embodiment according to FIG. 4, the moving bed drier 7 is constructed as a multi-stage or multi-level drier provided with superposed floors 50 with openings through which the mixture of gypsum and heating balls agitated by the agitator arms 5, descends from one level to the other.

Figure 5:
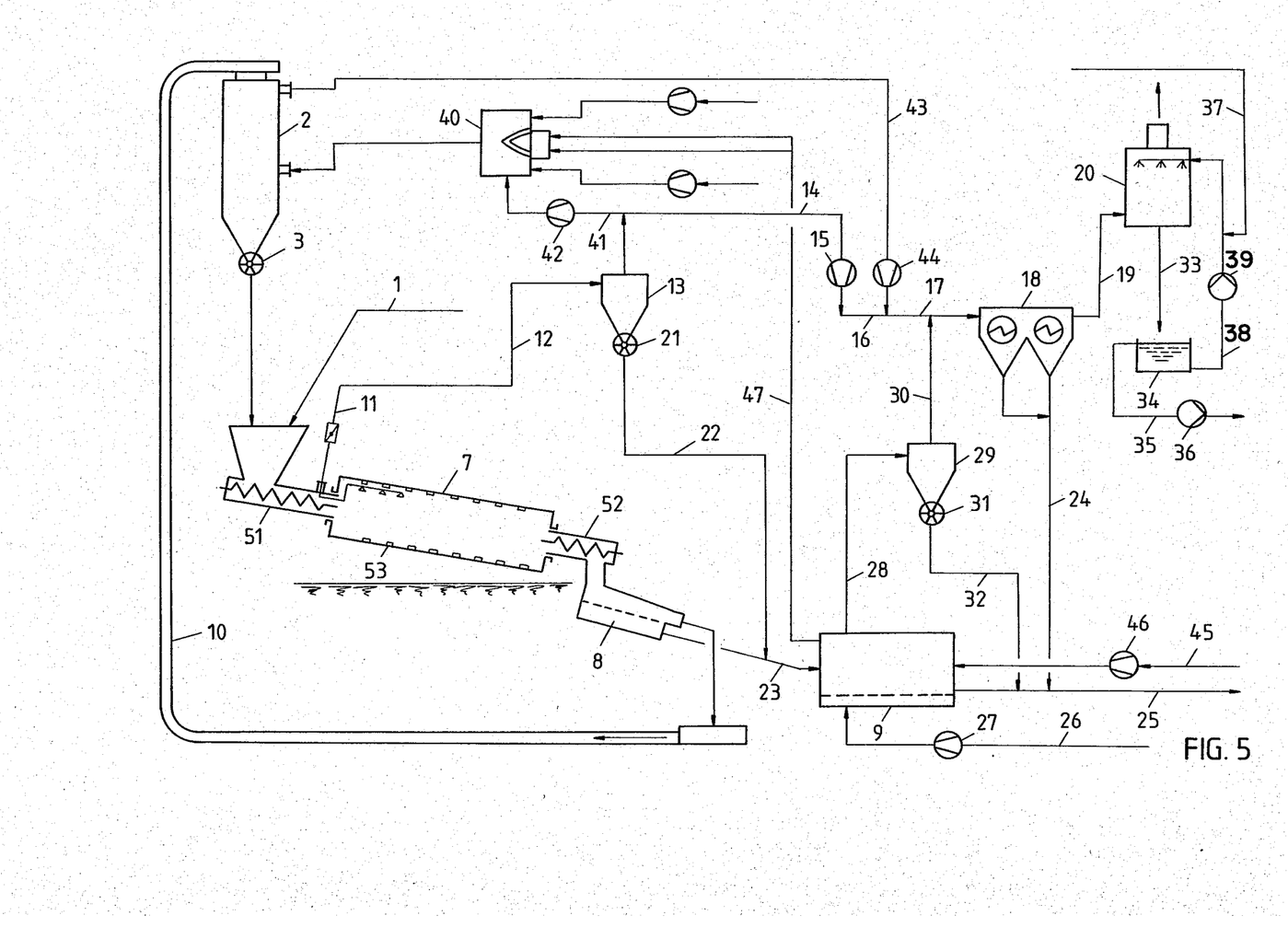
FIG. 5 shows an arrangement of this invention using a rotary drum type moving bed drier.

FIG. 5 depicts an embodiment of the moving layer type drier 7 having the form of inclined rotary drum provided at its elevated end with an inlet communicating with a screw conveyor 51 which simultaneously feeds the hot balls and the gypsum from an intake bin and during the feeding intermixes the two constituents. The discharge at the lower end of the drier 7 is also carried out by a screw conveyor 52, which conveys the treated mixture to the classifying and discharging device 8. The exhaust of vapors from the rotary drier 7 takes place via a conduit 11 passing through the case of the screw conveyor 51 and projecting into the interior of the drum. The inner wall of the drum is also provided with agitating projections 53 which keep the heating balls in movement.

Figure 6:
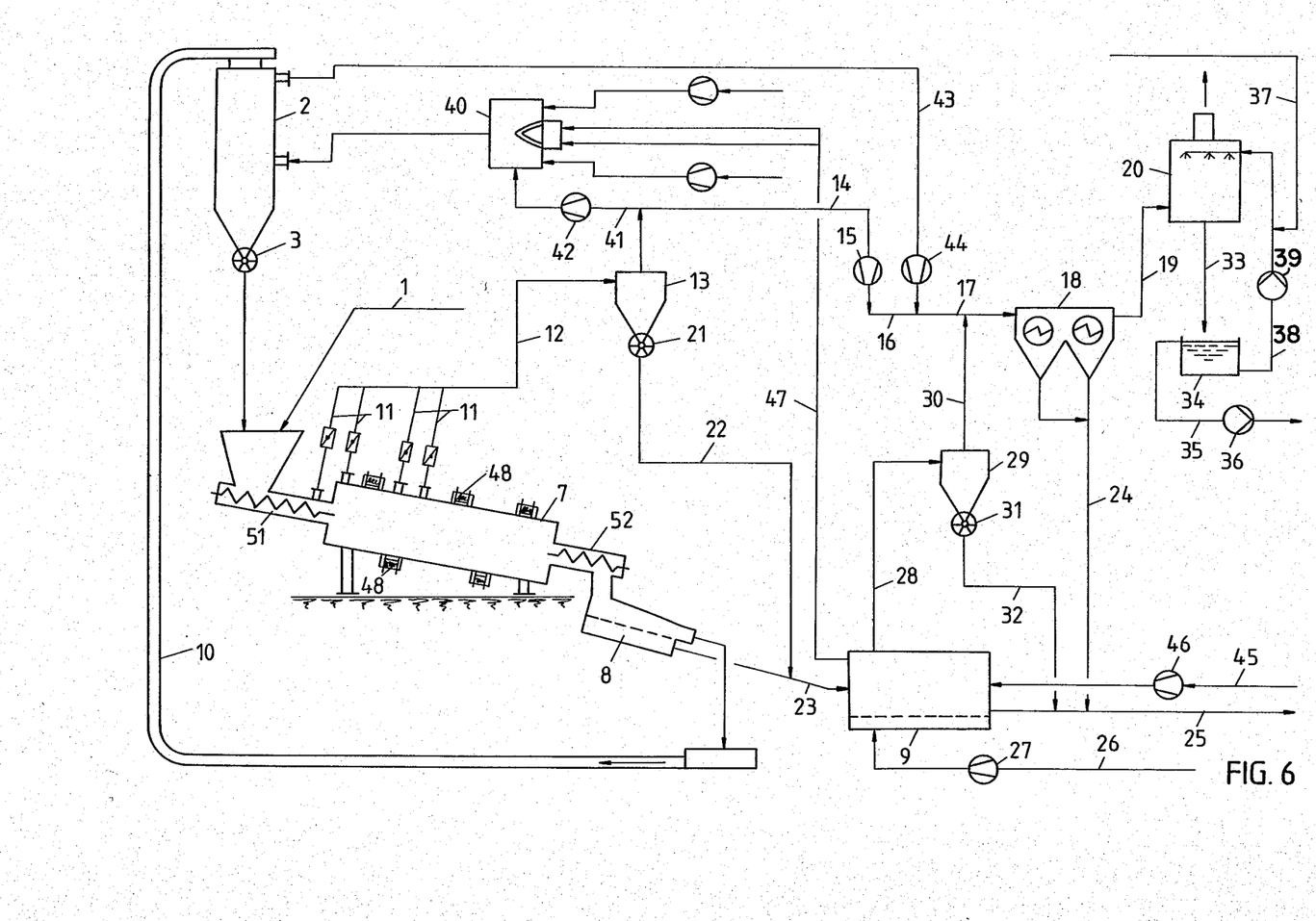
FIG. 6 illustrates a moving bed drier in an inclined vessel.

In the embodiment according to FIG. 6, the moving layer type drier 7 is in the form of an inclined stationary container through which, similarly as in the embodiment according to FIG. 5, the feed is advanced by means of intake and discharge screw conveyors 51 and 52. The heating steel balls in the mixed stream are alternately attracted by solenoids 48 arranged in staggered pattern on the upper and lower sides of the container. The solenoids are sequentially energized, so as to impart movement to the steel balls, the movement resembling a sine curve. In this manner, the separation of the mixture is prevented and gypsum is maintained in loose condition.

Figure 7:
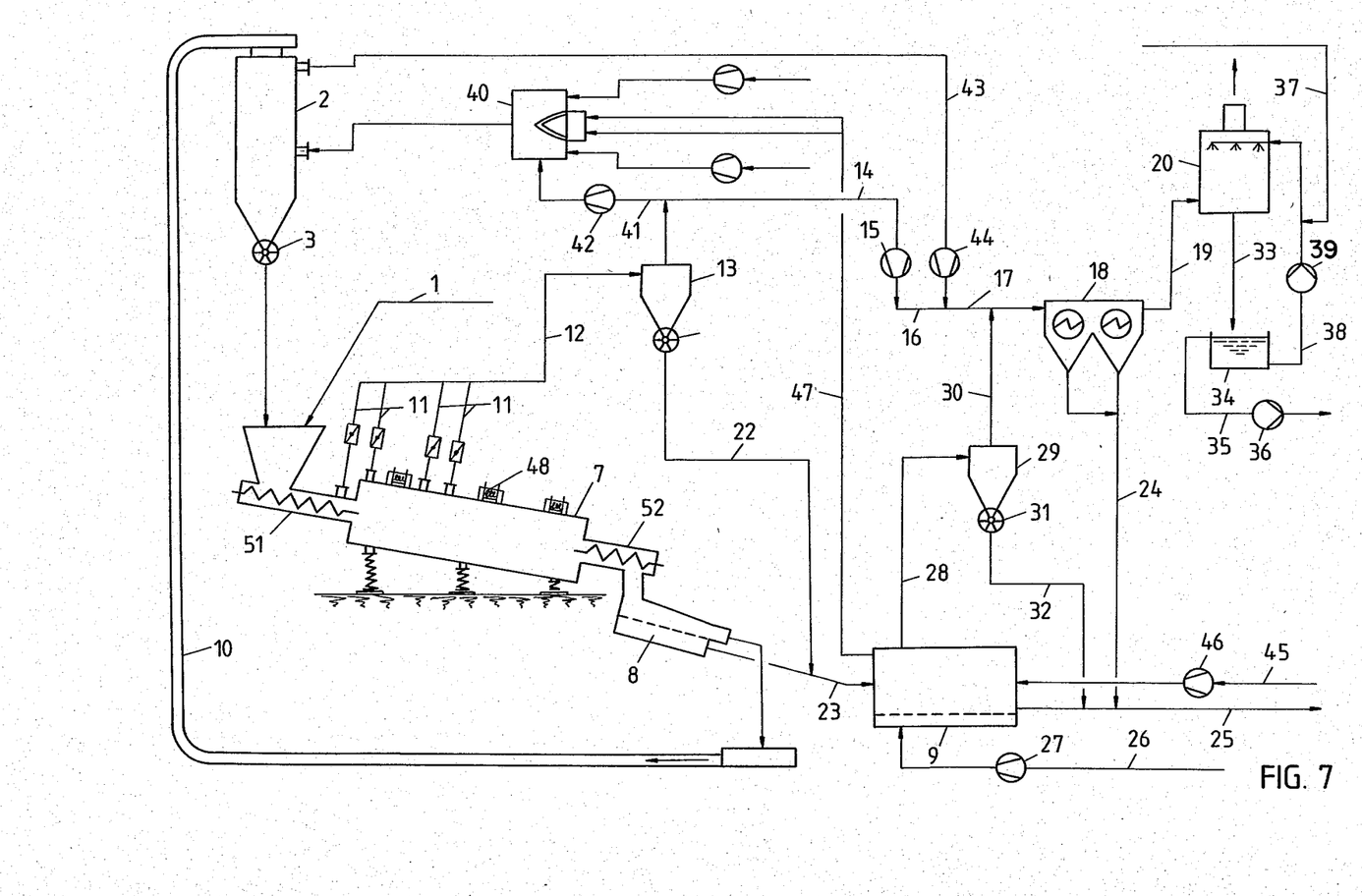
FIG. 7 illustrates the application of a moving bed drier using a vibrating chute.

FIG. 7 depicts an embodiment similar to FIG. 6, except that the inclined container of drier 7 is resiliently supported to act as a vibrating chute. In order to prevent the heating steel balls from accumulating at the bottom of the container due to their higher specific weight, the solenoids 48 at the top of the container are periodically energized, so as to impart to the balls a sine-like movement.

Figure 8:
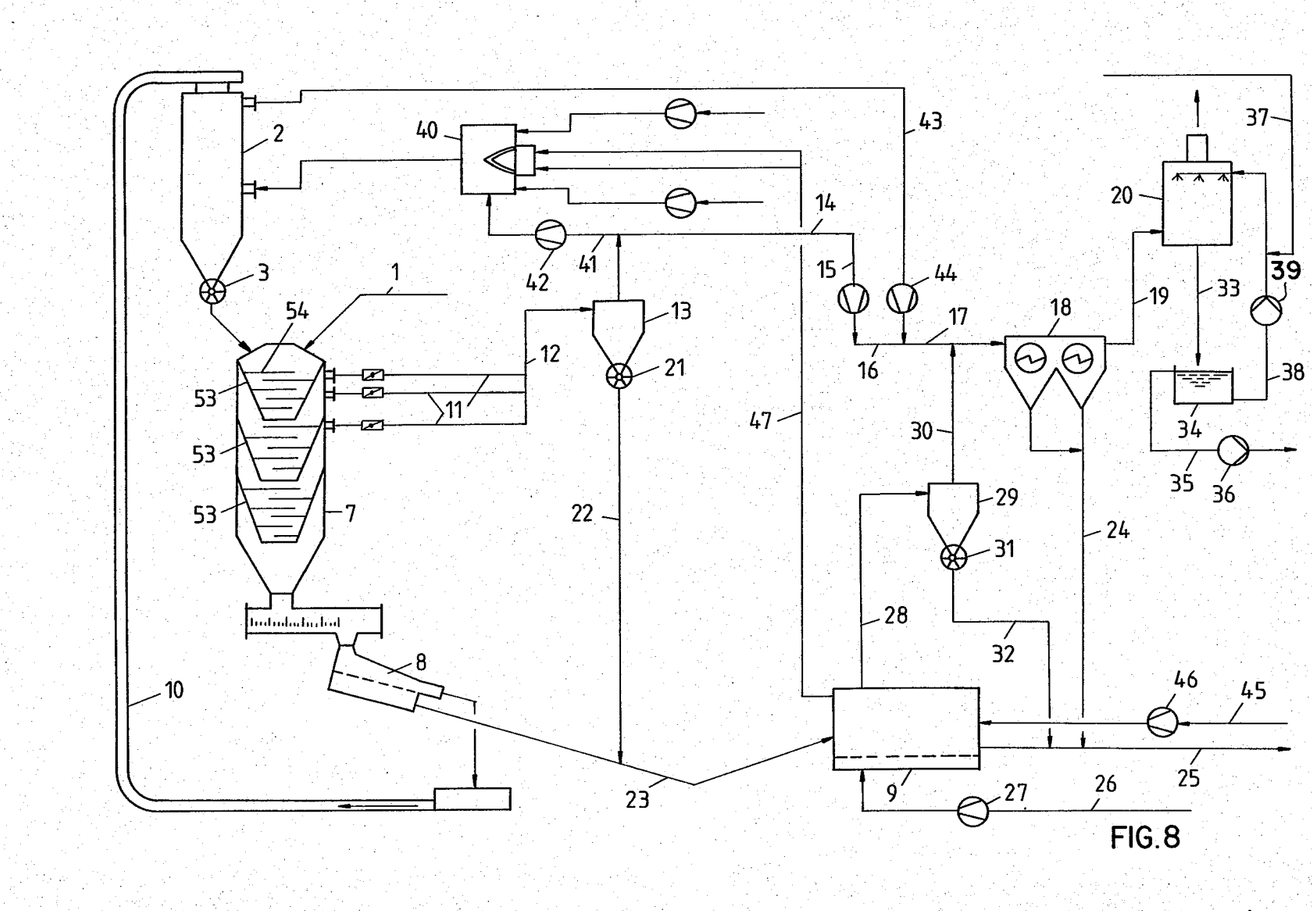
FIG. 8 is a device according to this invention using a moving bed drier in an upright vessel provided with a plurality of superposed hoppers.

The embodiment according to FIG. 8 includes a stationary, upright, moving-layer type drier 7 assembled of a plurality of superposed funnel-like sections 53. Preferably, the sections 53 have a conical wall with a staggered baffle plates 54 in their interior which assist in intermixing the heating balls and the gypsum during their descent.

The method and the device of this invention has the following advantages:
(a) an increased specific heat exchanging surface which, depending on the radius of the heating balls, amounts to from 200 to 4000 cubic meters/cubic meter;
(b) an increased heat exchanging coefficient between 80 and 1000 W/m$^3$K;
(c) relatively small drying space (4–16 cubic meters) per 71 t/h dry gypsum;
(d) an increased ratio of power to area, between 700 and 5200 kW/m$^3$;
(e) lower consumption of electrical energy, 10–60 kW for conveying the solid heat carriers;
reduced personnel costs for operation and maintenance of the device and consequently reduced maintenance costs; and
(g) neligible anti-pollution problems.

EXAMPLE

In the following numerical example, steel balls are employed as heat-carrying solid particles for drying the amount of 102 t/h of gypsum. t,0130

It will be understood that each of the elements described above, or two or more together, may also find a useful application in other types of constructions differing from the types described above.

While the invention has been illustrated and described as embodied in specific examples of the gypsum drying installation, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for drying cold, wet gypsum, comprising a heater; means for feeding a plurality of heat-retaining solid particles into said heater; means for storing gypsum to be dried; a moving-layer-type drier in the form of an upright stationary container having an inlet at its top, an outlet at its bottom and a plurality of superposed funnel-like means arranged between the inlet and the outlet; means for conveying an amount of hot solid particles from said heater and an amount of gypsum from said storing means into the inlet of said drier; and separating discharging device connected to the outlet of the drier to separate the dried gypsum from the solid particles.

2. A device as defined in claim 1, wherein said separating discharging device includes a vibrating screen for separating dried gypsum from the used solid particles.

3. A device as defined in claim 1, wherein said separating discharging device includes pneumatic means for separating the gypsum from said solid particles.

4. A device as defined in claim 1, further including means for recirculating the separated solid particles into said heating means.

5. A device as defined in claim 1 wherein at least one of said sections has an inner wall provided with staggered baffle plates to assist in mixing the gypsum with the heated balls.

6. A device for drying cold, wet gypsum, comprising a heater; means for feeding a plurality of heat-retaining solid particles into said heater; means for storing gypsum to be dried; a moving-layer-type drier in the form of an upright stationary container having an inlet at its top, an outlet at its bottom and a plurality of superposed funnel-like means arranged between the inlet and outlet; means for intermixing the amount of hot solid particles from said heater and an amount of gypsum from said storing means and conveying the mixed stream into the inlet of said drier; said funnel-like means assisting in drying the gypsum by forming layers of the mixed stream during its downward movement by gravity, and separating discharging device connected to the outlet of the drier to separate the dried gypsum from the solid particles.

* * * * *